United States Patent [19]

Metz

[11] 4,408,735

[45] Oct. 11, 1983

[54] PROCESS FOR PILOTING AND GUIDING PROJECTILES IN THE TERMINAL PHASE AND A PROJECTILE COMPRISING MEANS FOR IMPLEMENTING THIS PROCESS

[75] Inventor: Pierre Metz, Paris, France

[73] Assignee: Thomson-CSF, Paris, France

[21] Appl. No.: 204,039

[22] Filed: Nov. 4, 1980

[30] Foreign Application Priority Data

Nov. 9, 1979 [FR] France ................................ 79 27712

[51] Int. Cl.³ .......................... F41G 7/20; F42B 15/02
[52] U.S. Cl. ................................... 244/3.22; 244/3.16
[58] Field of Search ....................... 244/3.1, 3.15, 3.16, 244/3.21, 3.22

[56] References Cited

U.S. PATENT DOCUMENTS

| | | |
|---|---|---|
| 3,034,434 | 5/1962 | Swaim et al. ...................... 244/3.22 |
| 3,072,055 | 1/1963 | Ross . |
| 3,273,825 | 9/1966 | Kerner . |
| 3,282,540 | 11/1966 | Lipinski ............................... 244/3.16 |
| 3,455,243 | 7/1969 | Martin . |
| 3,621,784 | 11/1971 | Mundie . |
| 3,843,076 | 10/1974 | King et al. .......................... 244/3.22 |
| 3,860,199 | 1/1975 | Dunne . |
| 4,176,814 | 12/1979 | Albrehtsson et al. .............. 244/3.21 |
| 4,193,688 | 3/1980 | Watkins ............................... 244/3.16 |

FOREIGN PATENT DOCUMENTS

| | | |
|---|---|---|
| 2231947 | 12/1974 | France . |
| 2346673 | 10/1977 | France . |
| 2364164 | 4/1978 | France . |
| 2367659 | 5/1978 | France . |
| 902615 | 8/1962 | United Kingdom . |

*Primary Examiner*—Harold J. Tudor
*Attorney, Agent, or Firm*—Cushman, Darby & Cushman

[57] ABSTRACT

A process for piloting and guiding a projectile in the terminal phase in which the correction is obtained by means of a barrel of (n) impellers with lateral nozzles. Combustion of the first is triggered off when the rotational speed of the sight line reaches a triggering threshold. The mean thrust of each of the impellers which discharge successively and completely during a single revolution of the projectile is directed in the same direction located with respect to an absolute system of reference axes tied to the target. Detection of the target by an optoelectronic circuit enables the moment when this triggering threshold is reached to be determined.

7 Claims, 9 Drawing Figures

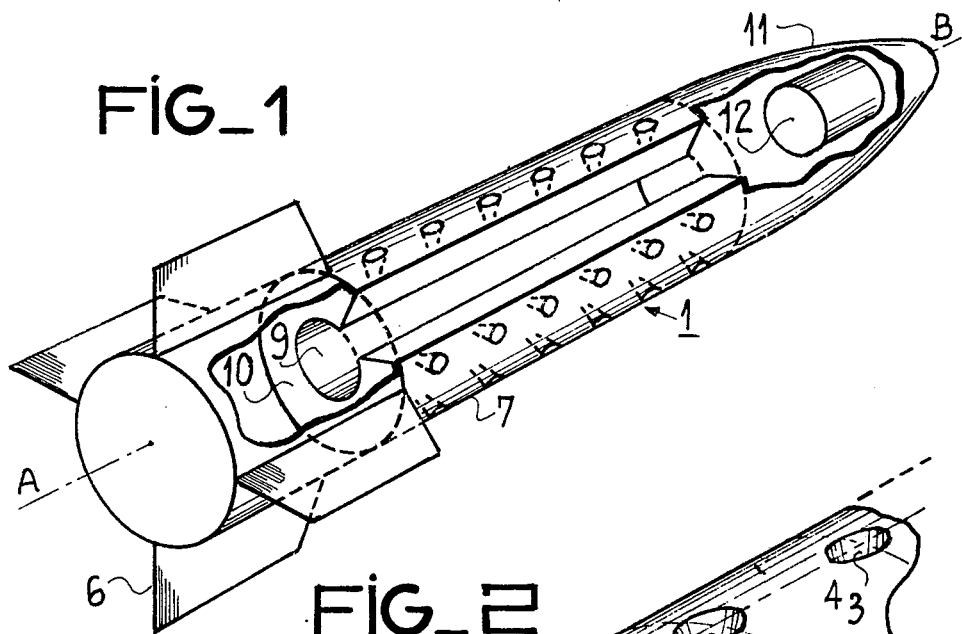
FIG_1
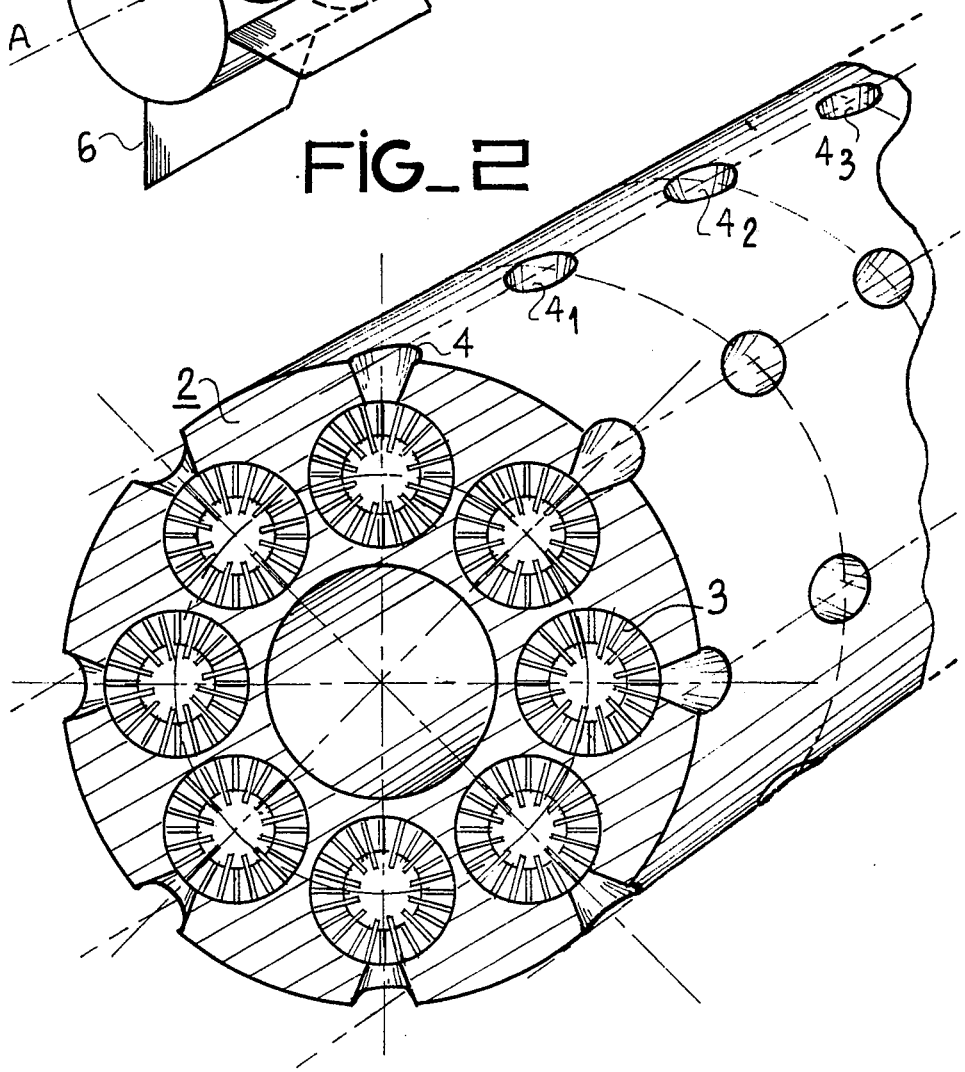
FIG_2

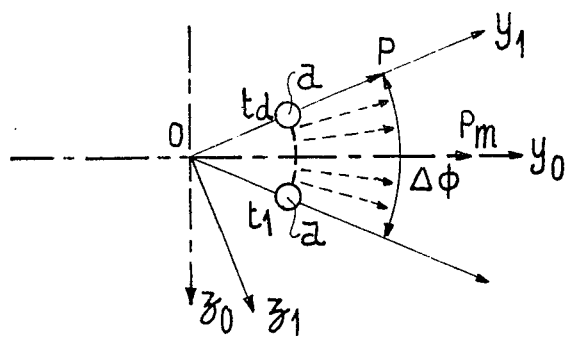
FIG_3
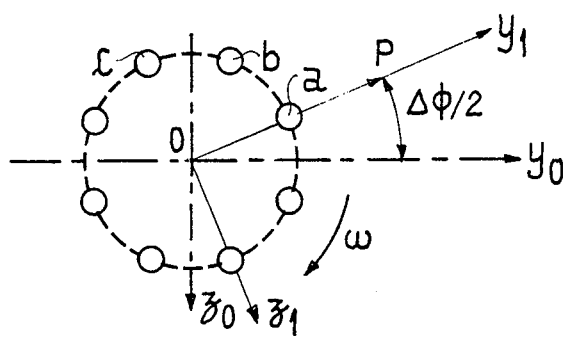
FIG_4
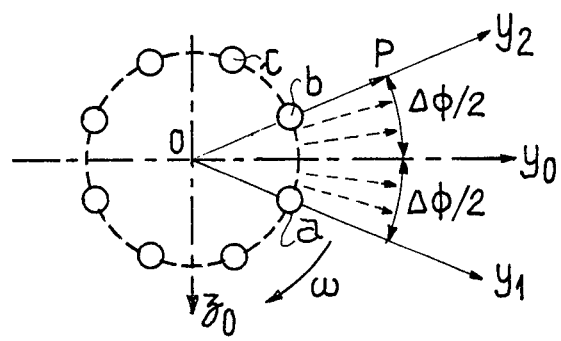
FIG_5
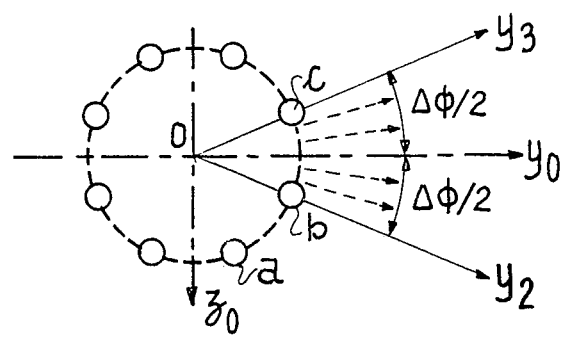
FIG_6

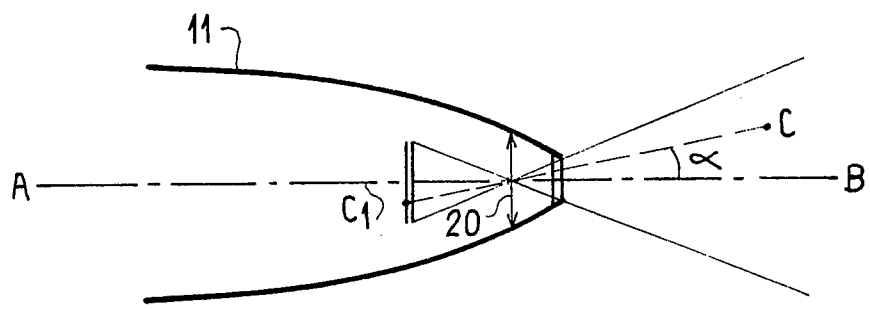
FIG_7
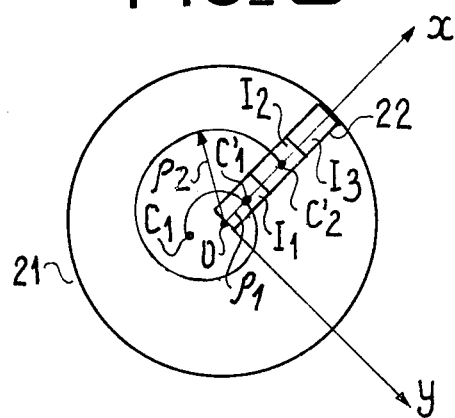
FIG_8
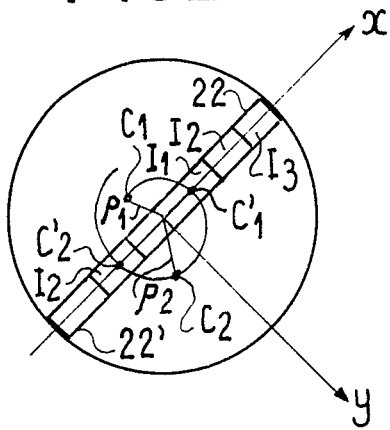
FIG_9

PROCESS FOR PILOTING AND GUIDING PROJECTILES IN THE TERMINAL PHASE AND A PROJECTILE COMPRISING MEANS FOR IMPLEMENTING THIS PROCESS

BACKGROUND OF THE INVENTION

The invention relates to a terminal-phase projectile guidance and piloting process. It also relates to the projectiles comprising the means for implementing these processes, particularly finned projectiles fired from a gun with training of the weapon in the direction of the future point of collision and whose trajectory is sufficiently flat to be likened to a straight line.

To increase the chances of hitting the target it is necessary to ensure piloting and guiding of the projectile towards the target aimed at, in the last phase of its trajectory. For that, use is generally made of correction motors which in the present state of the technique are complicated, very expensive and often do not give complete satisfaction.

SUMMARY OF THE INVENTION

The present invention has as its aim to palliate these disadvantages and relates to a process for providing piloting and guiding of a projectile of the type defined above in its final phase through an original arrangement of pyrotechnic means controlled from measuring means particularly from an optoelectronic circuit.

It relates more precisely to a process for piloting and guiding projectiles in the terminal phase, towards a target, characterized in that the total force required for obtaining the desired correction is applied laterally to the axis of the projectile in the form of a plurality of (n) elementary mean forces provided by a barrel of (n) impellers discharging successively and completely during a single revolution of spin of the projectile, (n) being a whole number greater than one.

DESCRIPTION OF THE DRAWINGS

The invention will be better understood from the explanations which follow and from the accompanying figures in which:

FIGS. 1 and 2 illustrate schematically in a longitudinal and cross-section a projectile comprising particularly pyrotechnic means for implementing the process in accordance with the invention.

FIGS. 3 to 6 are explanatory diagrams.

FIGS. 7, 8 and 9 illustrate particularly optoelectronic means cooperating with the pyrotechnic means for implementing the process of the invention.

For the sake of clarity, the same elements bear the same references in all the figures

DESCRIPTION OF THE PREFERRED EMBODIMENT

Figure 10:
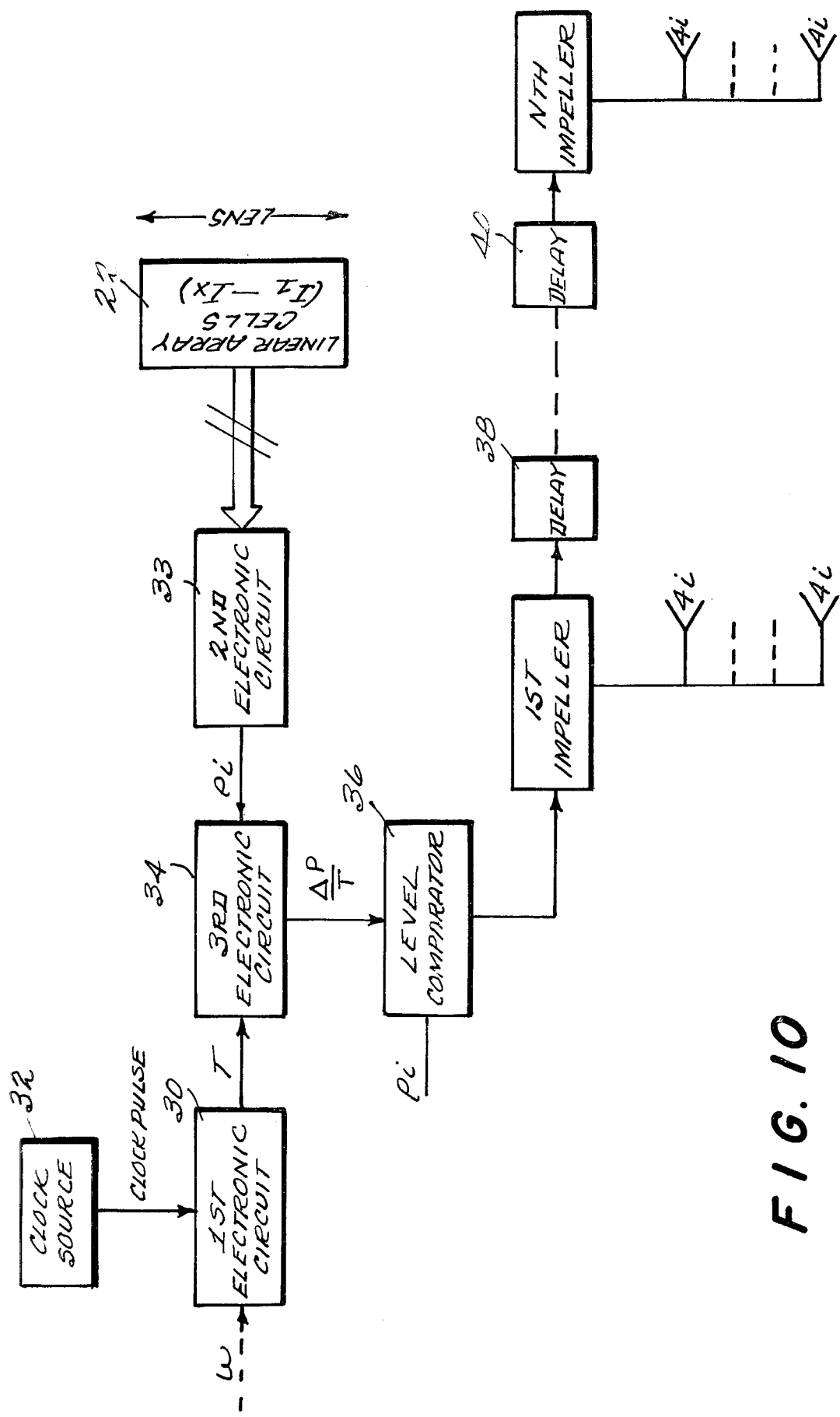
FIG. 10 illustrates a block diagram of one embodiment of the optoelectronic circuitry of the present invention.

To increase the chances of hitting the target it is then necessary, as was mentioned above, to effect a correction of the trajectory of the projectile at the end of the travel of this latter. The projectile must undergo a charge factor in a direction detected by a self-homing device so as to contract the passage distance. In accordance with the invention use is made to this end of a piloting system formed by a barrel of pyrotechnical powder impellers with nozzles directed perpendicularly to the axis of the projectile. Under these conditions, the total impulse required for obtaining this charge factor is divided into (n) elementary pulses (n being a whole number greater than 1). In a non-limiting embodiment a good compromise of the parameters concerned leads to choosing n=8. FIGS. 1 and 2 illustrate schematically a projectile 1 equipped in accordance with the invention with a barrel 2 of (n) powder propulsion devices 3, with nozzles 4 orientated perpendicular to the axis AB of projectile 1. These nozzles are preferably situated at the center of gravity of the projectile or between this latter and the nose cone 11 without however deviating too much therefrom, each impeller may comprise a plurality of nozzle elements $4_1, 4_2, 4_3 \ldots 4_4$ disposed longitudinally along the generatrix of these impellers (FIG. 2). Such a projectile 1 comprises essentially fins 6 fixed to the body 7 of the projectile 1. This body comprises a compartment 10 for receiving the barrel 2 of (n) impellers situated about a compartment 9 intended for the military part. Body 7 finishes in a nose cone 11 containing a number of pieces of equipment among which we find particularly a self-homing device 12.

The process in accordance with the invention comprises the following principal steps:

(a) detection of the angular speed of the projectile-target straight bearing line;

(b) measurement of the time $t_d$ when this speed is exceeded with respect to a predetermined threshold $S_1$;

(c) starting the combustion of a first impeller (a) from this time $t_d$, this first impeller (a) occupying a given position with respect to an absolute system of reference axes tied to the target, such that the mean lateral thrust P of this impeller is directed in a direction ensuring the desired correction with respect to this system of reference axes; this mean value P being the resultant of the elementary thrusts corresponding to nozzles $4_1, 4_2 \ldots 4_4$;

(d) rotation of the impellers, particularly of this first impeller (a) with that of the projectile at the same speed $\omega$ as it such that at the end of combustion the axis of impeller (a) has described an angle $\Delta\phi$;

(f) successive triggering of the second, third, fourth, nth impeller as soon as the axis of the thrust P of each one occupies, with respect to the system of reference axes, the position which the axis of the thrust of the first, one occupied at time $t_d$ from the beginning of its combustion.

FIG. 3 illustrates schematically the operation of an impeller, for example the first impeller (a) from the time of starting its combustion at time $t_d$ until the end thereof at time $t_1$. During this time $t_1$-$t_d$, the projectile to which is imparted a spin speed $\omega$ has covered a distance identified by the angle $\Delta\phi$. At time $t_d$ the thrust vector P is situated on an axis $oy_1$, forming with the axis $oy_o$ of a reference plane ($oy_o$, $oz_o$) an angle $\Delta\phi/2$. The mean thrust Pm is directed in direction $oy_o$.

FIGS. 4, 5 and 6 are explanatory diagrams showing the positional evolution, in time, of impellers a, b, c ... n. In FIG. 4, the impeller (a) directed along axis $oy_1$ of the plane ($oy_1$, $oz_1$) is fired when the angle which $oy_1$ forms with the axis $oy_o$ of the reference plane ($oy_o$, $oz_o$) tied to the target is equal to $\theta = \Delta\phi/2$. $\Delta\phi$ is the angle through which impeller (a) travels borne along in the rotational movement of the projectile at the rotational speed $\omega$ thereof during the period of its combustion. The spin speed $\omega$ of the projectile is assumed constant during the final correction phase. The direction of the mean thrust Pm then merges with the axis $oy_o$. In FIG. 5, the combustion of impeller (a) is finished, its axis $oy_1$ then forms with the absolute reference axis $oy_o$ a negative angle $\theta$ equal to $\Delta\phi/2$. In accordance with the invention, as soon as the axis $oy_2$ of the following impeller (b) forms an angle $\theta = \Delta\phi/2$, its combustion starts up. It rotates at the speed $\omega$ with the projectile and its combustion finishes when its axis $oy_2$ forms with the absolute reference axis $oy_o$ a negative angle $\theta = \Delta\phi/2$. Then, as FIG. 6 shows, as soon as the axis $oy_3$ of the following impeller (c) forms with axis $oy_o$ an angle $\theta = \Delta\phi/2$, its combustion is triggered off. At the end of combustion, the angle which its axis $oy_3$ forms with axis $oy_o$ is equal to a negative angle $\theta = \Delta\phi/2$ and the above-described process is repeated. It is moreover repeated also for each of the impellers of the barrel. The combustion times are calculated so that all the impellers are burnt during a complete rotation of the projectile on itself.

The barrel is thus discharged so that all the elementary thrusts of each impeller are superimposed. We have then available during the whole correction phase a mean force opposed to the mean thrust Pm centered on a direction determined by the angle $\Delta\phi/2$. This force is equal to the sum of the mean forces corresponding to each elementary thrust integrated on angle $\Delta\phi$.

This process is particularly interesting when a single correction at the end of the trajectory is desired. It assumes the acquisition of data for determining the threshold from which the correction is to be begun and particularly the spin angle of the projectile. Different processes may be used for acquiring this data. These measurements may for example be obtained from observations made on the ground: reception from a transmitting beacon carried by the projectile and tracking of the target for example. The measurement of the spin at the level of the projectile itself may also be effected with laser beam transmitting means situated on the ground. In both cases the firing order is sent from the ground.

But there exists another process preferred to the preceding ones and which is now described with reference to FIGS. 7, 8 and 9. It cooperates very efficiently with the pyrotechnic correction system in accordance with the invention. It is a question of measuring means tied to the projectile itself. The spin reference is sought by observation of the target itself and obtained by means of a self-homing device placed in the nose cone of the projectile. It is a more direct measurement: each time that the self-homing device passes in front of the target it determines the angle at which the projectile sees the target. The tip of the nose cone is equipped for that with an optical infrared detection system tied to the control device for starting combustion of the impellers. The infrared lens 20 cooperates with at least one bar 22 carried by a support 21. Such a bar 22 may be formed by a plurality of elementary cells mounted on each other. In FIG. 8, in order to facilitate understanding of the process, only three elementary cells $I_1$, $I_2$, $I_3$ have been shown rising one above the other from the center of support 21 to the periphery. This number may be much higher. (We have then (x) cells shown by an index $I_1$, $I_2$ ... $I_x$). When target C is in the field of the optical detection system the image of target $C_1$ fallson the support and at a given moment impresses bar 22 at a point $C'_1$. The cell on which the image of the target $C_1$ is impressed is situated at the distance $\rho_1$ from the center of the support itself merged with the axis of the projectile which depends on the angle $\alpha$ which the optical axis $CC_1$ (target-image of the target) forms with the axis AB of the projectile. Each time that the image point passes over the bar it impresses one of the elementary cells. For example, if during a revolution, image point $C'_1$ impresses the elementary cell $I_1$ of bar 22, the distance from this image point $C'_1$ to the axis of the projectile (passing through point O) is proportional to the angle $\alpha$, this distance is referenced $\rho_1$. During the next revolution, the image point may again impress the elementary cell $I_1$ or as is shown in FIG. 8, an adjacent elementary cell $I_2$. In this case, the distance from image point $C'_2$ to the axis of the projectile is equal to $\rho_2$. The process consists in storing during a revolution the measurement of $\rho_1$ and comparing it with the measurement $\rho_2$ made during the next revolution. When the angle $\alpha$ evolves rapidly at each revolution of the projectile it is a different cell of the bar which is impressed by the image of the target, as has just been explained with reference to FIG. 8.

The process then consists in choosing a number of cells such that between two successive cells we have the relationship:

$$\frac{d\omega_o}{dt} = \frac{\rho_2 - \rho_1}{T} = S_1 = \text{triggering threshold in which:}$$

$\frac{d\omega_o}{dt}$ is the instantaneous speed of rotation of the line of sight T the result of the counting of the clock between two revolutions of the calculator belonging to the self-homing device.

$\rho_1$ represents the deviation between the image of target $C'_1$ which impresses cell $I_1$ of bar 22 and the axis of the projectile during the first revolution.

$\rho_2$ represents the deviation between the image of the target $C'_2$ which impresses cell $I_2$ of this same bar 22 and the axis of the projectile during the following revolution.

If between two revolutions of the projectile, the image $C_1$ of the target impresses two different cells, the triggering threshold $S_1$ is reached and the combustion of the first impeller is triggered off. Taking into account the measurement of T (counting of the clock of the computer) so the spinning speed $\omega$ of the projectile over this portion of the trajectory and the moment when the detection system passes over the target, the required delay for firing the impeller concerned is calculated. Then, if the angle which the nozzles of an impeller form with that of the following one is $\rho_{(ab)}$ it is necessary that $\omega.t_r = \rho(ab)$ from which we get the measurement of the delay time $t_r$ for triggering off the following propulsion device with respect to the preceding propulsion device.

Referring now to FIG. 10, a conventional electronic circuit 30, which receives suitable clock signals from a source 32 as noted above, produces an output indicating the period T of rotation of the projectile. A second circuit 33 receives the output of the cells 22 and produces a signal indicating the polar coordinate of the target image received on the detector cell on successive rotations of the projectile. Circuits 30 and 32 are in turn connected to circuit 34 which calculates the value of the magnitude rate of the detected polar coordinate upon successive rotations. The output of circuit 34 is compared by a level detector 36 with a threshold value. When the magnitude rate exceeds the threshold value, the first impeller is triggered and thereafter the other impellers are triggered after suitable delays by circuits 38, 40 and the like.

In the example described, a single bar of infrared cells was used but so as to increase the information rate, several bars may be used as is shown in FIG. 9. In the example now described there are shown only two bars 22 and 22' but the number of bars could thus be multiplied. Each of these bars comprises a number of elementary cells $I_1, I_2 \ldots I_x$. During a first revolution of the projectile a first cell of a given row of a given bar is impressed. During the next revolution either the same cell of the same bar is impressed; or a cell in a different row of the same bar, or finally a cell in a different row in another bar for example cell $I_2$ of bar 22'. From the corresponding signals emitted, the previously defined triggering threshold $S_1$ is determined.

The invention applies more particularly to anti-aircraft artillery shells, to projectiles used in anti-tank firing as well as to sub-projectiles used in ground-to-ground artillery.

I claim:

1. A method for correcting the terminal portion of the ballistic trajectory of a rotating projectile directed toward a target; said projectile having a barrel of impeller each provided with at least one lateral nozzle equally spaced around the circumference of the projectile body and an optical sensor located within the nose section, said method comprising the steps of:
   (a) measuring the period of rotation T of the projectile about its longitudinal axis (A-B);
   (b) detecting the optical image ($C_1$) of the target (C) on the successive rotations of the projectile;
   (c) measuring the polar coordinate (Pi) of this image of the target at least once during the period of rotation of the projectile;
   (d) calculating the magnitude of the rate of change of the successive polar coordinate measurements;
   (e) comparing this calculated magnitude to a predetermined threshold value $S_1$;
   (f) measuring the instant of time $T_d$ when the calculated magnitude rate exceeds the threshold value;
   (g) triggering of a first impeller at time $T_d$, and then sequentially after a given delay a second, third and finally $n^{th}$ impeller in relation to the measured period of rotation of the projectile so that the mean thrust of all the impellers is in the same direction to correct said terminal portion of trajectory.

2. A method according to claim 1, wherein the step of measuring the polar coordinate of the target image is carried out twice during the period of rotation of the projectile.

3. A method according to claim 1, wherein the optical image of the target is received on a plane support comprising a linear array of photocells radially arranged from the longitudinal axis of the projectile to the periphery of the projectile, so that the photocell impressed by the said image of the target is representative of the direction of the target.

4. A method according to claim 3, wherein the photocells are arranged with respect to each other, so that, when said magnitude exceeds the said threshold, the image of the target impresses two different photocells between a first revolution of the projectile and the next one.

5. A projectile rotating around its longitudinal axis (A-B) and having a barrel of n impellers equally spaced around the circumference of the projectile for generating an orientable lateral thrust P, and an optoelectronic sensor located within its nose-section, said optoelectronic sensor comprising:
   (a) a clock source;
   (b) a first electronic means for calculating the period of rotation T of the projectile;
   (c) at least a linear array of optical detector cells extending radially from the longitudinal axis of the projectile, this detector array being located in the image plane of the lens;
   (d) a second electronic means for detecting the polar coordinate ($pi$) of the target image received on a detector cell on successive rotations of the projectile;
   (e) a third electronic means for calculating the value of magnitude rate of change of the detected polar coordinate of the image target on successive rotation of the projectile;
   (f) a signal level comparator having inputs connected to the third electronic means and a threshold signal source for generating a triggering signal when said magnitude exceeds said threshold signal which is provided to a first impeller and sequentially via a time delay to a second, third, and finally to the $n^{th}$ impeller so that the mean thrust of all the impellers is in the same direction to correct said terminal portion of tragectory.

6. A projectile according to claim 5, wherein the optoelectric sensor comprises a first linear array of detector cells and a second one, both these arrays of detectors being diametrically situated with respect to the longitudinal axis of the projectile.

7. A projectile according to claim 5, wherein the value of the spacing between two adjacent detector cells is in direct relation to the value of the threshold signal source.

* * * * *